United States Patent [19]

Nawata

[11] Patent Number: 4,518,900
[45] Date of Patent: May 21, 1985

[54] PULSE MOTOR DRIVING APPARATUS

[75] Inventor: Yoshiaki Nawata, Yokohama, Japan

[73] Assignee: Tokyo Shibaura Denki Kabushiki Kaisha, Kawasaki, Japan

[21] Appl. No.: 513,031

[22] Filed: Jul. 12, 1983

[30] Foreign Application Priority Data

Jul. 15, 1982 [JP] Japan .................. 57-123651

[51] Int. Cl.³ .............................................. H02P 1/58
[52] U.S. Cl. ..................... 318/102; 318/598; 318/807
[58] Field of Search ............... 318/5, 85, 101, 102, 318/103, 561, 590, 597, 598, 807

[56] References Cited

U.S. PATENT DOCUMENTS

| 3,710,214 | 1/1973 | Anderson | 318/102 |
| 3,757,179 | 9/1973 | Pedersen | 318/101 X |
| 4,055,786 | 10/1977 | DiMarzio | 318/102 X |
| 4,100,466 | 7/1978 | Schroeder | 318/102 |
| 4,233,666 | 11/1980 | Walberg et al. | 318/102 X |
| 4,423,366 | 12/1983 | Gottwald | 318/685 X |

FOREIGN PATENT DOCUMENTS 0537747 7/1941 United Kingdom .............. 318/102

Primary Examiner—Stanley J. Witkowski
Assistant Examiner—Bentsu Ro
Attorney, Agent, or Firm—Cushman, Darby & Cushman

[57] ABSTRACT

A pulse motor driving apparatus is comprised of a timer circuit generating a slue-up pulse and a normal operation pulse, latch circuits latching a phase designating signal in synchronization with the slue-up pulse and normal operation pulse of the timer circuit, and driving circuits driving pulse motors in response to the latched, phase designating signal of the latch circuits. The timer circuit is comprised of first and second counters for generating the slue-up pulse and normal operation pulse. In the slue-up operation mode, two of the pulse motors are driven in synchronization with the output pulses of the first and second counters. Upon completion of the slue-up operation, the two pulse motors are driven in a normal operation mode, in synchronization with the output pulse of the first counter.

3 Claims, 3 Drawing Figures

PULSE MOTOR DRIVING APPARATUS

BACKGROUND OF THE INVENTION

This invention relates to a pulse motor driving apparatus and, more particularly, to a pulse motor driving apparatus for driving a plurality of pulse motors.

A prior art pulse motor driving apparatus for driving a plurality of pulse motors is provided with a plurality of timer circuits corresponding to a plurality of pulse motors. These timer circuits are respectively connected to latch circuits. Exciting phase designating signals are inputted, from a control circuit, into the latch circuits. The latch circuits latch the exciting phase designating signals in synchronization with slue-up pulses and high speed normal operation pulses supplied thereto from the timer circuits. The pulse motors are driven in accordance with the respective latch signals latched in the latch circuits.

In the above-mentioned prior art apparatus, however, it is necessary to use, as a control circuit for supplying the phase designating signals to the latch circuits, a circuit which is capable of performing a high speed operation corresponding to 6,000 pulses/sec when driving three pulse motors which are so arranged as to be driven by the total number of latch pulses required to drive the pulse motors (e.g., 2,000 pulses per second per motor). Further, in said prior art pulse motor driving apparatus, since the timer circuits are provided with reference to their respective pulse motors, a large number of timer circuits are necessary, with the result that the circuit construction becomes complicated.

SUMMARY OF THE INVENTION

In view of the above, the object of the present invention is to provide a pulse motor driving apparatus whose circuit construction is simplified, without necessitating a high speed control circuit.

According to the present invention, when first and second pulse motors, which are so arranged as to rotate at the same speeds, or at different speeds which are simply integer multiples of the same base speed, are in a state wherein they have just begun to rotate, first and second timing pulse generating circuits supply first and second slue-up pulses to first and second driving circuits, respectively, thereby causing the first and second pulse motors to be driven by their respective slue-up pulses. When the pulse motors have been brought into a state wherein they make their normal rotations, the first timing pulse generating circuit supplies a normal pulse to the first and second driving circuits, thereby driving the first and second pulse motors.

DETAILED DESCRIPTION OF THE PREFERRED EMBODIMENT

Figure 1:
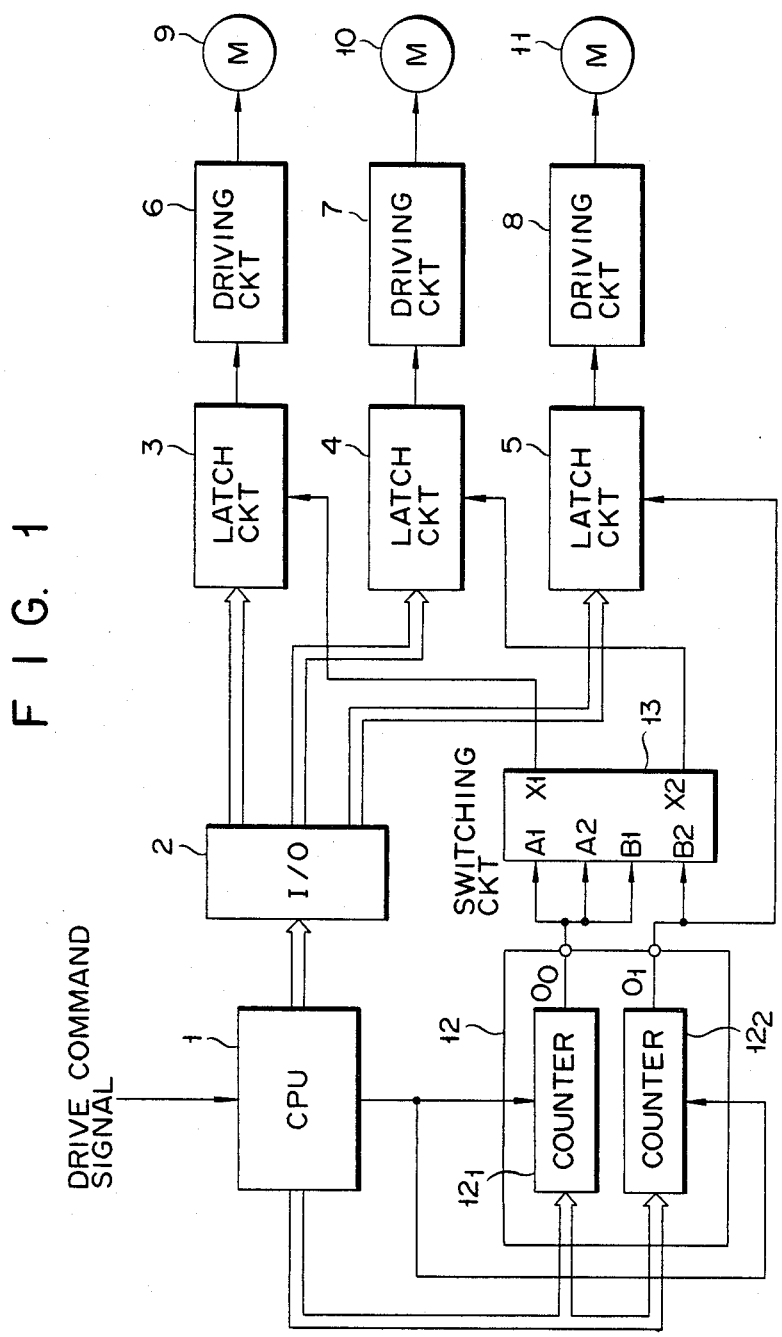
FIG. 1 is a block circuit diagram of the pulse motor driving apparatus according to an embodiment of the present invention.

In FIG. 1, a control circuit, e.g., CPU 1, is comprised of a central processor unit (e.g., CPU 8049 of Intel Corporation), and a data output section thereof is connected to the input section of an I/O port 2 (e.g., I/O port 8243 of Inter Corporation). The output section is connected to latch circuits 3, 4 and 5, the output terminals of which are connected to the input terminals of driving circuits 6, 7 and 8, respectively. The output terminals of the driving circuits 6, 7 and 8 are connected to motors 9, 10 and 11, respectively. Motors 9 and 10 are pulse motors which are arranged to rotate in response to, for example, 1,500 pulses/sec, while the motor 11 is one which is arranged to rotate in response to, for example, 2,000 pulses/sec. The preset data output section and clock output terminal of CPU 1 are connected to the preset data input section and clock input terminal of a timer circuit 12, respectively. The timer circuit 12 is comprised of a first counter $12_1$ and a second counter $12_2$. One output terminal $O_0$ of this timer circuit 12 is connected to input terminals A1, A2 and B1 of a switching circuit 13, while another output terminal $O_1$ thereof is connected to input terminal B2 of the same switching circuit 13 as well as to a latch input terminal of a latch circuit 5. The switching circuit 13 includes a TC-4019 switching circuit, which is manufactured by Toshiba. Output terminals X1 and X2 of this switching circuit 13 are connected to the latch input terminals of latch circuits 3 and 4, respectively.

Figure 2:
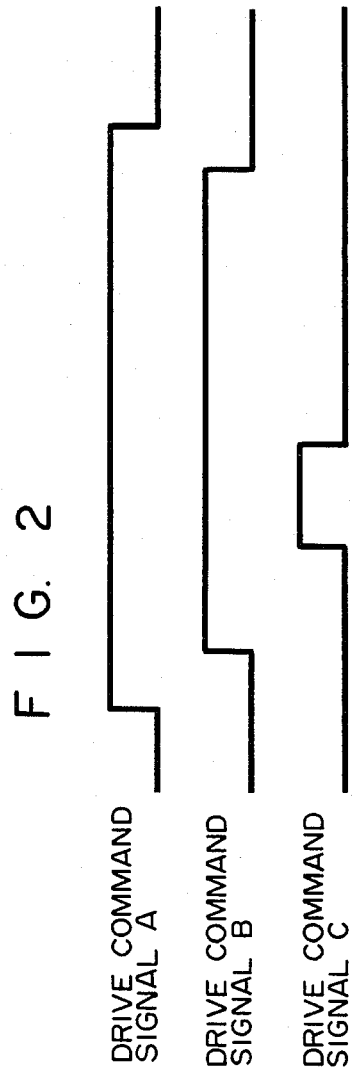
FIG. 2 is a time chart of the pulse motor drive instruction signals.

In the above-mentioned circuitry, the CPU 1 operates in accordance with the control program stored in a ROM which is built therein. For instance, the CPU 1 conducts a slue-up operation, or an operation of increasing the rotational speed of the pulse motors 9 to 11 from a low speed to a high speed in the initial period of rotation thereof. When a drive command signal shown in FIG. 2, e.g., a signal A for driving the pulse motor 9, is inputted from an external device to the CPU 1, CPU 1 supplies an exciting phase (e.g., an A-phase) designating signal (encoded in, for example, four-bits) to the I/O port 2. The I/O port 2 transfers the A-phase designating signal to the latch circuit 3. Further, at this time, the CPU 1 supplies an item of preset data, i.e., a preset value for starting the slue-up operation, to the timer circuit 12, thereby setting the first counter $12_1$ to the preset value. Further, the CPU 1 supplies to the switching circuit 13 a switching signal which activates input terminals B1 and B2. The first counter $12_1$ of the timer circuit 12 counts the clock pulses inputted thereto from the CPU 1 and, when this counted value reaches the preset value, the timer circuit 12 supplies a latch pulse to the switching circuit 13 through the output terminal $O_0$. This latch pulse is inputted into the latch circuit 3 through output terminal X1 of the switching circuit 13. Since, on the other hand, the latch circuit 3 is supplied with the A-phase designating signal from the I/O port 2, the circuit 3 latches this A-phase designating signal in response to the latch pulse. When the latched A-phase designating signal is inputted into the driving circuit 6, this circuit 6 supplies an exciting current to an A-phase coil of the pulse motor 9, thereby driving the pulse motor 9.

When the first counter $12_1$ has its counted value made consistent with the preset value, the CPU 1 operates to preset the first counter $12_1$ to the next preset value and, at the same time, to supply a B-phase designating signal to the I/O port 2. The I/O port 2 transfers the B-phase designating signal to the latch circuit 3. When the counted value of the first counter $12_1$ reaches the new preset value, the timer circuit 12 again supplies a latch pulse to the switching circuit 13 through the output terminal $O_0$. The switching circuit 13 supplies the latch pulse inputted thereto to the latch circuit 3 through its output terminal X1. The latch circuit 3 latches the B-phase designating signal and supplies this latched signal to the driving circuit 6. Consequently, a B-phase coil of the pulse motor 9 is energized, whereby this motor 9 is allowed to rotate further.

Figure 3:
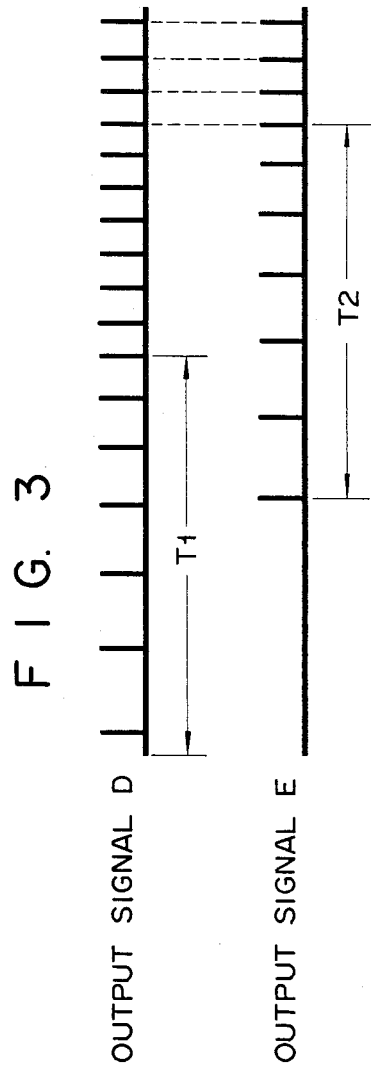
FIG. 3 is a time chart of the output signals of the switching circuit shown in FIG. 1.

In the above-mentioned manner, the pulse signal shown in FIG. 3, whose pulse interval gradually decreases or a slue-up pulse signal D, is outputted from the output terminal X1 of the switching circuit 13. After the lapse of the slue-up period T1, a pulse signal of specified pulse width or interval, or a normal operation pulse signal, is supplied to the latch circuit 3 through the switching circuit 13 as a latch pulse. At this time, A-, B-, C- and D-phase designating signals are repeatedly inputted sequentially into the latch circuit 3 through the I/O port 2, and are sequentially latched in the latch circuit 3 in synchronization with the latch pulse. The driving circuit 6 supplies, in sequential order, the exciting current to A-, B-, C- and D-phase coils of the pulse motor 9, whereby the pulse motor 9 is rotated at a high speed normal rotation.

When, during the slue-up period, a drive command signal B (FIG. 2) for driving the pulse motor 10 is supplied to the CPU 1, the CPU 1 presets the second counter $12_2$ of the timer circuit 12 to a preset value corresponding to the slue-up pulse of the pulse motor 10, and the I/O port 2 transfers the phase designating signals to latch circuits 3 and 4. When the second counter $12_2$ counts the clock pulses and this counted value reaches the preset value, the timer circuit 12 supplies the latch pulse to the input terminal B2 of the switching circuit 13 through the output terminal $O_1$. The switching circuit 13 transfers the latch pulse to the latch circuit 4 through the terminal X2, thereby making the latch circuit 4 ready for the latching operation. Thus, the latch circuit 4 latches the phase designating signal inputted thereto through the I/O port 2. When the latched signal is supplied to the driving circuit 7, the pulse motor 10 commences the slue-up operation. Thereafter, similar operations are carried out, whereby a slue-up pulse signal E shown in FIG. 3 is outputted from the terminal X2 of the switching circuit 13 during the period T2. Once the slue-up operation of the pulse motor 10 is complete, the CPU 1 makes operative only the counter $12_1$ preset to the preset value corresponding to the normal operation and, at the same time, supplies a switching signal to the switching circuit 13 in such a way as to activate the terminals A1, A2 of the switching circuit 13. Accordingly, the normal operation pulse, or latch pulse, which is outputted from the counter $12_1$ of the timer circuit 12, is inputted to the latch circuits 3, 4 through the terminals (A1, A2 and X1, X2). Thus, the latch circuits 3, 4 are controlled by the same latch pulse and latch the phase designating signals inputted thereto. Upon supply of the latched signal to the driving circuits 6, 7, pulse motors 9 and 10 are driven to rotate with the same timing. When, thereafter, the phase designating signals are input to latch circuits 3 and 4 through the I/O port 2, while being repeatedly renewed, and the normal operation latch pulse is sequentially input to latch circuits 3 and 4, pulse motors 9 and 10 make their normal rotation at the same rate of speed.

When, during the period in which pulse motors 9 and 10 are in normal rotation, the drive command signal C for pulse motor 11 is supplied to the CPU 1, the CPU 1 presets the second counter $12_2$ of the timer circuit 12 to the preset value corresponding to the slue-up pulse, and the I/O port 2 transfers the phase designating signals to latch circuit 5, as well as to latch circuits 3 and 4. When the counted value of the counter $12_2$ reaches the preset value, a latch pulse is inputted into the latch circuit 5 through the output terminal $O_1$ of the timer circuit 12. Thus, the latch circuit latches the phase designating signal inputted thereto through the I/O port 2 and supplies the latched signal to the driving circuit 8. The driving circuit 8 causes the pulse motor 11 to start its slue-up operation. The slue-up operation of the pulse motor 11 is carried out by supply of the slue-up pulse to the latch circuit 5, as a latch pulse, as in the case of pulse motors 9 and 10. Upon completion of the slue-up operation, a normal operation pulse is supplied to the latch circuit 5, whereby the pulse motor 11 commences normal operation.

As stated above, where a plurality of pulse motors are driven, these motors are driven during the slue-up period, in synchronization with their corresponding slue-up pulses from a plurality of timing pulse generating sources. When the pulse motors come into a state of normal operation, one of the plurality of timing pulse generating sources is commonly used for the normal driving of the plurality of pulse motors, which are driven to rotate in synchronization with the timing pulse of this timing pulse generating source, the remaining timing pulse generating sources being used for the slue-up operations of the remaining pulse motors. Moreover, since this type of pulse motor driving apparatus does not require use of the same number of timing pulse generating sources as pulse motors, its circuit construction is simplified.

Further, the control circuit controlling the timing pulse generating sources can have its control capacity reduced to an extent corresponding to the reduction of the number of timing pulse generating sources to be controlled and, thus, does not require a high speed control function.

What is claimed is:

1. A pulse motor driving apparatus for driving a plurality of pulse motors by transferring the operational mode thereof from a slue-up operation wherein the speeds of rotation of said motors are gradually increased to a normal operation wherein said motors are rotated at a constant speed, comprising:

at least first and second timing pulse generating sections for selectively generating slue-up timing pulses having gradually decreasing pulse intervals and normal operation timing pulses having a constant pulse interval, respectively;

a plurality of driving means each connected to an associated one of said plurality of pulse motors for driving the same in synchronization with said slue-up timing pulses and normal operation timing pulses; and switching means connected between said timing pulse generating sections and said driving means for producing, during the slue-up operation of at least one of said pulse motors, a first switching mode wherein the respective slue-up timing pulses generated by said first timing pulse generating section are supplied to the one of said plurality of driving means associated with said one pulse motor to independently drive said one motor according to slue-up timing pulses and, during the normal operation of at least two of said pulse motors, for producing a second switching mode wherein the normal operation timing pulses generated by said second timing pulse generating sections are supplied in common to the two driving means associated with said two pulse motors to drive said two pulse motors in common according to the normal operation timing pulses.

2. The pulse motor driving apparatus according to claim 1, wherein said timing pulse generating sections each include data outputting means for outputting a clock pulse and preset data corresponding to said slue-up operation and normal operation; and, wherein a plurality of counters are preset by said preset data of said data outputting means, to count said clock pulses and to output said timing pulse when their counted value reaches said preset value.

3. A pulse motor driving apparatus for driving a plurality of pulse motors by transferring the operational mode thereof from a slue-up operation wherein the rotations of said motors are gradually speeded up to a normal operation wherein said motors are rotated at a constant speed, comprising:
   at least two timing pulse generating sections for selectively generating slue-up timing pulses having gradually decreasing pulse intervals and normal operation timing pulses having a constant pulse interval;
   a plurality of driving means each connected to an associated one of said plurality of pulse motors for driving the same in synchronization with said slue-up timing pulses and normal operation timing pulses; and
   switching means connected between said timing pulse generating sections and said driving means for supplying during the slue-up operation of at least one of said pulse motors, the respective slue-up timing pulses generated by one of said timing pulse generating sections to the one of said driving means associated with said one pulse motor to independently drive said one motor according to its respective slue-up timing pulses and for supplying, during the normal operation of at least two of said pulse motors, the normal operation timing pulses generated by one of said timing pulse generating sections to said driving means associated with said two pulse motors to drive said two pulse motors in common according to the normal operation timing pulses,
   wherein said each of said plurality of driving means includes means for outputting a phase designating signal, latch means for latching said phase designating signal in synchronization with the timing pulses of said timing pulse generating sections, and driving circuit means for driving said pulse motors in accordance with the respective phase designating signals latched by said latch means.

* * * * *